June 18, 1935.    G. DAVIS ET AL    2,005,613
HOSE COUPLING
Filed July 6, 1934

Inventor
George Davis
Jack H. Davis
By Clarence A. O'Brien
Attorney

Patented June 18, 1935

2,005,613

UNITED STATES PATENT OFFICE 2,005,613

HOSE COUPLING

George Davis and Jack H. Davis, Dallas, Tex.

Application July 6, 1934, Serial No. 734,050

1 Claim. (Cl. 285—86)

This invention relates to a hose coupling, the general object of the invention being to provide means whereby an end of the hose can be easily coupled with another member without danger of the connection between the hose and said member leaking.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 1:
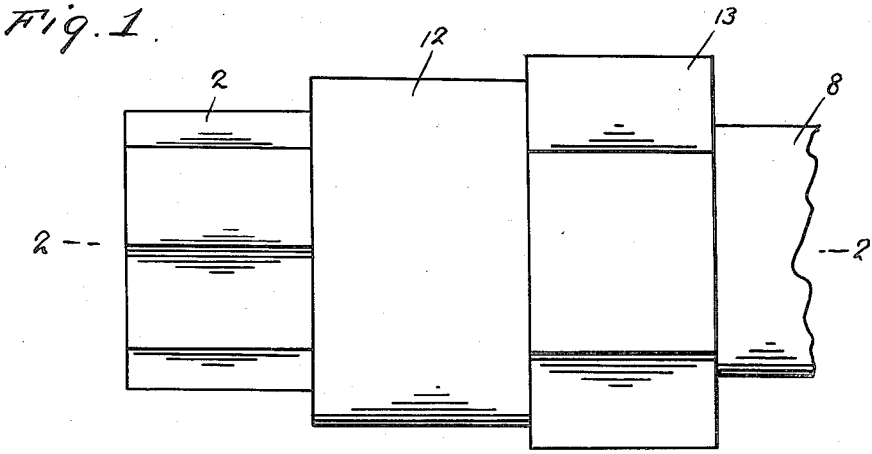
Figure 1 is an elevation showing the invention in use on a hose.

In this drawing, the numeral 1 indicates a tubular member which has one end part of non-circular shape in cross section as shown at 2 with the rest of the member exteriorly threaded as shown at 3 and this part is provided with longitudinally extending slots 4, the inner ends of which terminate short of the inner end of the threaded portion. The interior faces of the segments formed by the slots 4 are provided with the teeth 5 and the toothed part gradually increases in thickness from a point spaced from the inner end of the part 1 to a point adjacent the outer end thereof as shown clearly in Figure 2. A nozzle or inner member 6 has its major portion formed with the annular teeth 7 for cooperating with the teeth 5 for holding a part of a hose 8 between them, the teeth 7 being spaced an appreciable distance from the threaded end 9 of the member 6 and also slightly spaced from the other end of the member 6, said other end being provided with the notches 10 as shown. The part 2 of the member 1 is formed with a reduced internal threaded part receiving the threaded end 9 of the member 6 and with a larger internally threaded part 11 for receiving the threaded end of a member to which the hose is to be coupled. A sleeve 12 is threaded on the outer member and a nut 13 is threaded on the outer part of said member, as clearly shown in Figure 2, so as to hold the segments in gripping engagement with the hose.

Figure 2:
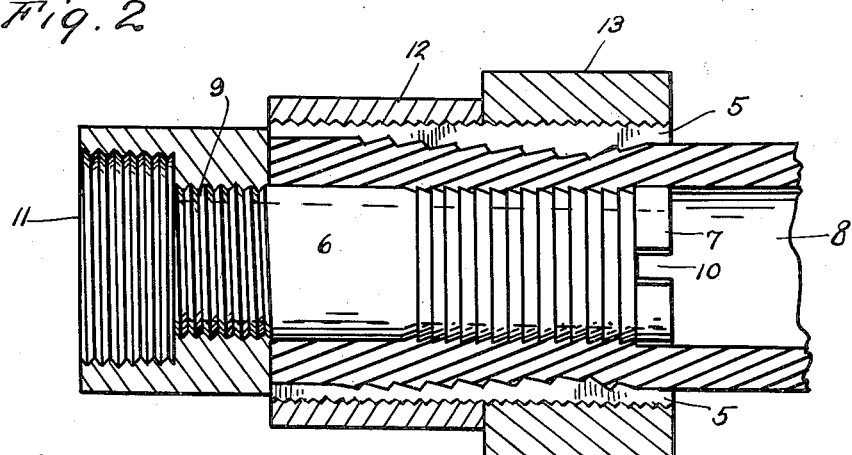
Figure 2 is a section on line 2—2 of Figure 1.
Figure 3:
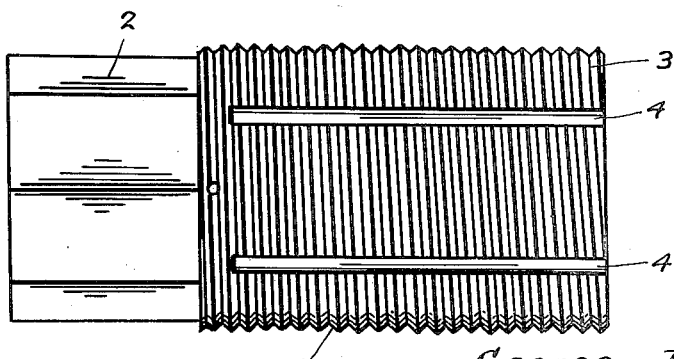
Figure 3 is a view of the slotted member of the coupling.

As shown in Figure 2, the end of the hose fits in what might be termed a pocket at the inner end of the threaded part of the member 1, which prevents leaking at this point.

In assembling the device, the member 6 has its threaded end 9 threaded in the part 2 of the member 1 and the segments are expanded so as to encircle the hose 6. Then the sleeve 12 and the nut 13 are put in place which contracts the segments and causes their toothed parts 5 to firmly clamp a part of the hose against the member 6.

It is thought from the foregoing description that the advantages and novel features of the invention will be readily apparent.

It is to be understood that changes may be made in the construction and in the combination and arrangement of the several parts provided that such changes fall within the scope of the appended claim.

What is claimed is:

A hose coupling of the class described comprising a member having its major portion of cylindrical shape and of the same exterior diameter throughout, the rest of the member being reduced and of non-circular shape in cross section, said reduced part having a threaded bore therein, the inner portion of which is of considerable less diameter than the interior diameter of the major portion, said major portion being externally screw threaded and having longitudinally extending slits therein terminating short of the inner end thereof, the interior faces of the segments formed by the slits having teeth thereon, the toothed parts gradually increasing in thickness toward the outer end of the member, a nipple having one end threaded in the inner portion of the bore of the non-circular portion with the rest of the nipple extending into a hose placed between the same and the first mentioned member, said nipple having its major portion forming an uninterrupted cylinder with teeth of annular form on the major portion of the exterior thereof for cooperating with the teeth of the first mentioned member for holding a portion of a hose between the two members and a nut threaded on the outer portion of the member.

GEORGE DAVIS.
JACK H. DAVIS.